(12) United States Patent
Ha

(10) Patent No.: US 8,438,374 B2
(45) Date of Patent: May 7, 2013

(54) COMPUTER SYSTEM AND CONTROL METHOD OF THE SAME

(75) Inventor: Jong-uk Ha, Suwon-si (KR)

(73) Assignee: SAMSUNG Electronics Co., Ltd., Suwon-si (KR)

( * ) Notice: Subject to any disclaimer, the term of this patent is extended or adjusted under 35 U.S.C. 154(b) by 0 days.

(21) Appl. No.: 13/369,572

(22) Filed: Feb. 9, 2012

(65) Prior Publication Data

US 2012/0137116 A1 May 31, 2012

Related U.S. Application Data

(63) Continuation of application No. 12/357,585, filed on Jan. 22, 2009, now Pat. No. 8,140,838.

(30) Foreign Application Priority Data

Jul. 3, 2008 (KR) .................. 10-2008-0064517

(51) Int. Cl.
*G06F 11/00* (2006.01)
*G06F 15/177* (2006.01)

(52) U.S. Cl.
USPC .................................. 713/1; 713/2; 714/100

(58) Field of Classification Search .................. 713/1, 2; 714/100
See application file for complete search history.

(56) References Cited

U.S. PATENT DOCUMENTS

| 5,564,054 | A | 10/1996 | Bramnick et al. |
| 6,519,698 | B1 * | 2/2003 | Leyda et al. ................. 713/2 |
| 6,560,641 | B1 | 5/2003 | Powderly et al. |
| 7,100,036 | B2 | 8/2006 | Schwartz |
| 7,308,102 | B2 | 12/2007 | Anson et al. |
| 7,861,117 | B2 * | 12/2010 | Coronado et al. ............ 714/36 |
| 8,140,838 | B2 * | 3/2012 | Ha ................................. 713/1 |
| 2002/0133695 | A1 | 9/2002 | Khatri et al. |

OTHER PUBLICATIONS

US Office Action issued Jun. 23, 2011 in U.S. Appl. No. 12/357,585.
Chinese Office Action dated Mar. 5, 2013 issued in CN Application No. 200910132926.5.

* cited by examiner

*Primary Examiner* — Mark Connolly
(74) *Attorney, Agent, or Firm* — Stanzione & Kim, LLP

(57) ABSTRACT

A computer system includes a device which transmits data through a predetermined interface and outputs first recognition information in response to a predetermined power on self test (POST) control signal, a device controller which has second recognition information about whether the device is mounted, and a system controller which outputs the POST control signal to the device when powering on, and recognizes the device on the basis of the first recognition information and the second recognition information.

10 Claims, 4 Drawing Sheets

COMPUTER SYSTEM AND CONTROL METHOD OF THE SAME

CROSS-REFERENCE TO RELATED APPLICATIONS

This application is a continuation application of Ser. No. 12/357,585 filed Jan. 22, 2009 now U.S. Pat. No. 8,140,838 in the U.S. Patent and Trademark Office, which claims the benefit of Korean Patent Application No. 10-2008-0064517, filed on Jul. 3, 2008, in the Korean Intellectual Property Office, the disclosure of which is incorporated herein in its entirety by reference.

BACKGROUND OF THE INVENTION

1. Field of the Invention

The present general inventive concept relates to a computer system and a control method of the same, and more particularly to a computer system with a device controller having information for recognizing a device, and a control method thereof.

2. Description of the Related Art

Recently, a central processing unit (CPU) of a computer system has increased in speed, and introduction of a high speed bus such as peripheral component interface (PCI)-express, universal serial bus (USB), institute of electrical and electronics engineers (IEEE) 1394, etc. has caused performance of the computer system to be developed rapidly. However, the maximum speed of a parallel advanced technology attachment (PATA) standard is limited to 133 MB/s, so that it can be an obstacle to the development of the performance in the computer system. To overcome the obstacle, a serial advanced technology attachment (SATA) standard was proposed. The SATA supports the maximum speed of 1.5 Gbps, and further a SATA-II standard supports the maximum speed of 3.0 Gbps.

Meanwhile, the computer system boots up and runs a power on self test (POST) when it turns on. During the POST, the computer system is initialized and a basic input/output system (BIOS) examines devices. Here, the BIOS examines whether or not its memorized contents are identical to the devices (e.g. a hard disk drive, a modem, a printer, a local area network (LAN) card, etc.) actually attached to the computer system when powering on. To this end, the BIOS outputs a POST control signal for recognizing the device to each device. The POST for checking which and how many devices are connected to the computer system or whether the devices are properly connected to the computer system and initializing the devices is performed before loading an operating system. If there is a device that does not suitably respond to the POST control signal, the BIOS does not recognizes this device. In this case, even though the device is connected to the computer system, the BIOS cannot recognize and initialize the device. This may result in a booting failure and thus cause inconvenience to a user.

SUMMARY OF THE INVENTION

Accordingly, it is an aspect of the present invention to provide a computer system capable of correctly recognizing devices when booting up, and a control method thereof.

Another aspect of the present invention is to provide a computer system capable of overcoming an error in recognizing devices, and a control method of the same.

Additional aspects and utilities of the present general inventive concept will be set forth in part in the description which follows and, in part, will be obvious from the description, or may be learned by practice of the general inventive concept The foregoing and/or other aspects and utilities of the present invention can be achieved by providing a computer system including a device which transmits data through a predetermined interface and outputs first recognition information in response to a predetermined power on self test (POST) control signal, a device controller which has second recognition information about whether the device is mounted, and a system controller which outputs the POST control signal to the device when powering on, and recognizes the device on the basis of the first recognition information and the second recognition information.

The second recognition information may include a flag signal generated when the device is mounted.

The interface may support a serial advanced technology attachment (SATA) standard.

The interface may support a universal serial bus (USB) standard.

The system controller may determine whether the first recognition information is matched with the second recognition information, initializes the device if the first recognition information is matched with the second recognition information, and resumes a POST.

The system controller may determine whether the first recognition information is matched with the second recognition information, determines that the device is not recognized if the first recognition information is not matched with the second recognition information, and performs a system reset.

The system controller may make a count number of an error in recognizing the device if the first recognition information is not matched with the second recognition information, and records a device error if the count number exceeds a preset value.

The system controller may reset the count number when proceeding to initialize the device.

The system controller may determine whether the first recognition information is received, initializes the device when the first recognition information is received, and resumes a POST.

The system controller may determine whether the first recognition information is received, determines that the device is not recognized if the first recognition information is not received, and performs a system reset.

The system controller may include a basic input/output system (BIOS).

The foregoing and/or other aspects and utilities of the present invention can be achieved by providing a method of booting up a computer system that includes a device to transmit data through a predetermined interface, and a device controller having a second recognition information about whether the device is mounted, the method including outputting a predetermined power on self test (POST) control signal to the device, detecting a first recognition information in response to the POST control signal from the device and the second recognition information, and recognizing the device on the basis of the first recognition information and the second recognition information.

The recognizing the device may include whether the first recognition information is matched with the second recognition information, and the method further includes initializing the device if the first recognition information is matched with the second recognition information, and resuming a POST.

The recognizing the device may include whether the first recognition information is matched with the second recognition information, and the method further includes determining that the device is not recognized if the first recognition information is not matched with the second recognition information, and performs a system reset.

The method further includes making a count number of an error in recognizing the device, and recording a device error if the counter number exceeds a preset value.

The method further includes resetting the count number when proceeding to initialize the device.

The recognizing the device may include: determining whether the first recognition information is received; initializing the device when the first recognition information is received; and resuming a POST.

The recognizing the device may include: determining whether the first recognition information is received; determines that the device is not recognized if the first recognition information is not received; and performing a system reset.

The foregoing and/or other aspects and utilities of the present invention can be achieved by providing a computer-readable medium to contain computer-readable codes as a program to perform a method in a computer system, the method including outputting a predetermined power on self test (POST) control signal to the device, detecting a first recognition information in response to the POST control signal from the device and the second recognition information, and recognizing the device on the basis of the first recognition information and the second recognition information.

The foregoing and/or other aspects and utilities of the present invention can be achieved by providing a computer system including a device to output first recognition information in response to a predetermined power on self test (POST) control signal, a system controller to output the POST control signal to the device, and to recognize the device according to the first recognition information received from the device and second recognition information received from another device other than the device and representing a characteristic of the device.

The foregoing and/or other aspects and utilities of the present invention can be achieved by providing a computer system, including a device configured to generate second recognition information when being installed in the computer system and to generate first recognition information in response to a signal of the computer system when the computer system is turned on.

The foregoing and/or other aspects and utilities of the present invention can be achieved by providing a computer system, including a controller configured to receive a signal of a device when the device is installed in the computer system, and to generate recognition information corresponding to the signal of the device when the computer system is turned on.

The foregoing and/or other aspects and utilities of the present invention can be achieved by providing a computer system, including a system controller configured to receive first recognition information received from a device and second recognition information received from another device other than the device and representing a characteristic of the device, to recognize the device according to the first recognition information and the second recognition information.

The foregoing and/or other aspects and utilities of the present invention can be achieved by providing a computer system, including a device to generate second recognition information when being installed in the computer system and to generate first recognition information in response to a signal of the computer system when the computer system is turned on, a controller to receive a signal of a device when the device is installed in the computer system, and to generate the recognition information corresponding to the signal of the device when the computer system is turned on, a system controller to recognize the device according to the first recognition information and the second recognition information.

BRIEF DESCRIPTION OF THE DRAWINGS

The above and/or other aspects of the present general inventive concept will become apparent and more readily appreciated from the following description of the exemplary embodiments, taken in conjunction with the accompanying drawings, in which.

DETAILED DESCRIPTION OF THE PREFERRED EMBODIMENTS

Figure 1:
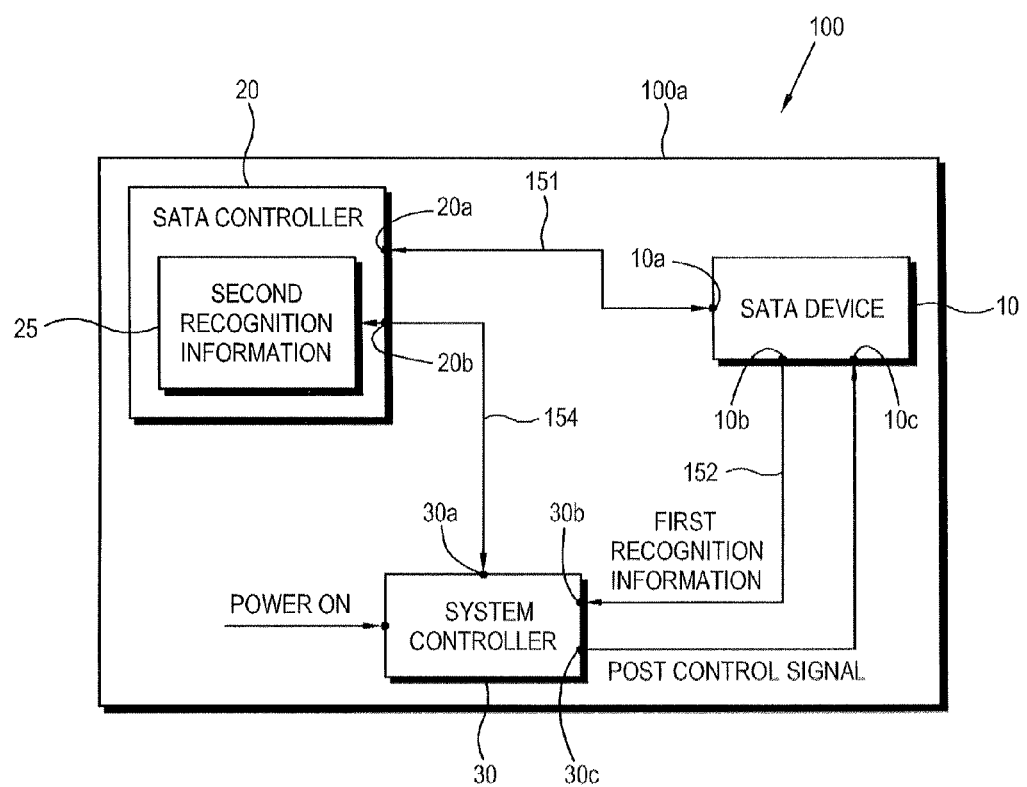
FIG. 1 is a control block diagram illustrating a computer system according to an embodiment of the present general inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

FIG. 1 is a control block diagram illustrating a computer system 100 according to an embodiment of the present general inventive concept.

Referring to FIG. 1, the computer system 100 according to this embodiment includes a serial advanced technology attachment (SATA) device 10, a SATA controller 20, and a system controller 30 to control the SATA device 10 and the SATA controller 20.

The SATA device 10 supports a SATA standard and may include a storage medium such as a hard disk drive or an optical disk drive connected to a computer system. The SATA device 10 transmits data as being connected to the computer system 10 through a predetermined interface, i.e., based on the SATA standard. Further, the SATA device 10 is connected to an internal board through a predetermined connector (not illustrated). Here, the SATA device 10 may output first recognition information in response to a power on self test (POST) control signal from the system controller 30 (to be described later). In a case where the SATA device 10 does not recognize the POST control signal or is defective, the SATA device 10 cannot normally output the first recognition information.

Referring to FIG. 1, the SATA device 10 is mounted to an inside of a housing 100a of the computer system 100. However, the SATA device 10 may be not mounted to the inside but an outside of the housing of the computer system 100. In this case, the SATA device 10 is mounted to an external connector and then connected to the computer system 100. Here, the external connector supports an interface based on the SATA standard.

According to an embodiment of the present general inventive concept, the SATA device 10 includes terminals 10a, 10b, and 10c to be connected to terminals 20a, 30b, an 30c of the SATA controller 20 and the system controller 30 through communication lines 151, 152, and 153, respectively. A terminal 30a of the system controller 30 may be connected to a terminal 20b of the SATA controller 20 through a communication line 154. When the SATA device 10 is mounted to the inside or outside of the computer system 100, the terminals 10a, 10b, and 10c can be connected to ends of the communication lines 151, 152, and 153. In this case, the ends of the communication lines 151, 152, and 153 may be formed with terminals or a shape of slots to receive the terminals 10a, 10b, and 10c of the SATA device 10.

As described above, the SATA device 10 includes a memory unit to store data, and a control unit to communicate with the SATA controller 20 and the system controller 30 to receive data to be stored in the memory unit and to transmit data read from the memory unit to at least one of the SATA controller 20 and the system controller 30. Also the control unit of the SATA device 10 can generate a first signal representing first recognition information and a second signal representing second recognition information.

The first recognition information is generated when the SATA device 10 is mounted to the housing 100a of the computer system 100, or when the SATA device 10 is supplied with a first electrical power through the system controller 30 or a power source. The second recognition information is generated when the computer system 100 is booted or turned on or when the SATA device 10 is supplied with a second electrical power after the first electrical power is disconnected. However, the present general inventive concept is not limited thereto. The first recognition information and the second recognition information can be sequentially generate according to a method of generating the first and second recognition information which will be described hereinafter.

The SATA controller 20 controls the SATA device 10 while communicating with the SATA device 10. The SATA controller 20 is included in an input/output control hub (ICH, not illustrated). The ICH is a hub of allowing various peripheral devices such as a peripheral component interface (PCI) controller, a universal serial bus (USB) controller, a local area network (LAN) controller, a basic input/output system (BIOS) read only memory (ROM), an input/output (10) controller, and an integrated drive electronics (IDE) controller to be connected each other in the computer system 100, which includes a plurality of communication channels to communicate with component devices. The SATA controller 20 has second recognition information 25 about whether the SATA device 10 is mounted or not. The second recognition information 25 contains a flag signal generated when the SATA device 10 is physically or electrically connected to the computer system 100. That is, the SATA controller 20 automatically forms a flag bit in response to the connection of the SATA device 10 as recognition information. The second recognition information 25 provides correct information about whether the SATA device 10 is mounted or not because it is generated in response to the physical or electrical connection of the SATA device 10.

Figure 2:
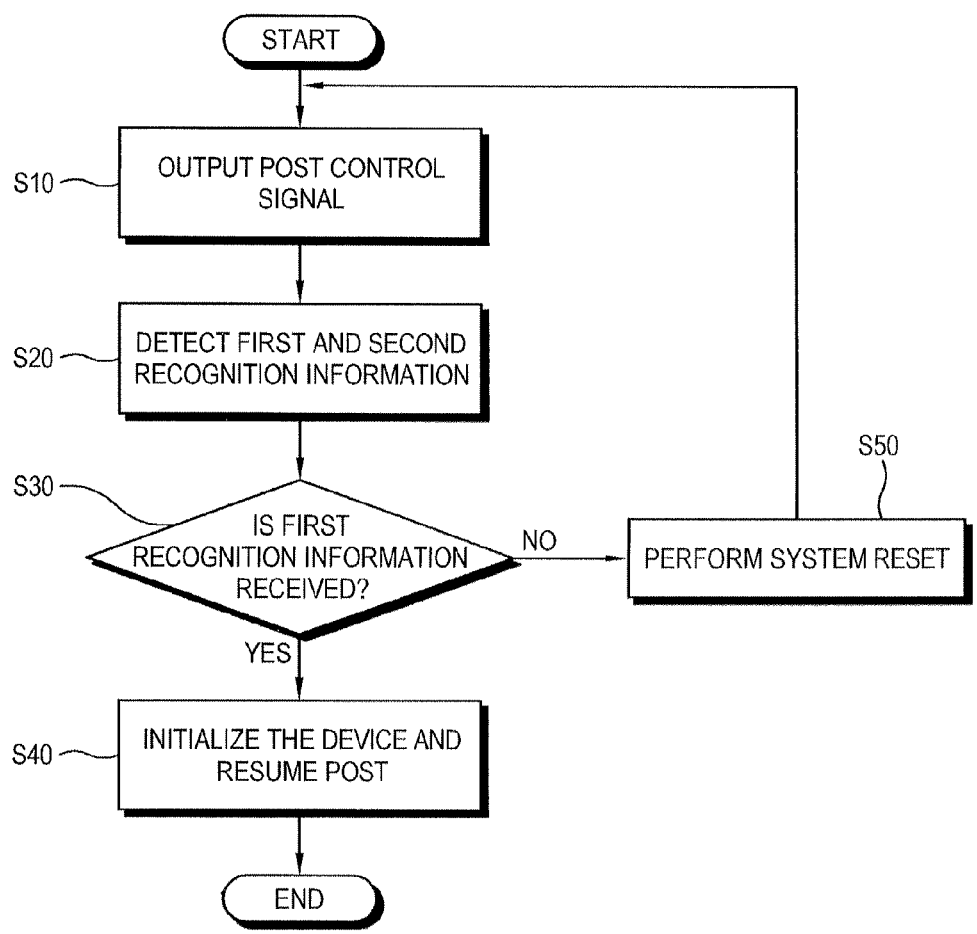
FIG. 2 is a control flowchart illustrating a control method of a computer system according to an embodiment of the present general inventive concept.

The system controller 30 outputs a POST control signal to the STATA device 10 and recognizes the SATA device 10 on the basis of the first recognition information and the second recognition information 25 when powering on. In the first embodiment, the system controller 30 may be achieved by a basic input/output system (BIOS) to perform the POST under control of a central processing unit (CPU). When the computer system 100 is first powered on, the CPU starts a bootstrap to boot up the computer system 100. The CPU performs the POST through the BIOS, and the BIOS checks connection states of plural devices attached to the computer system and initializes the plural devices. During the POST, the BIOS outputs the POST control signal for recognizing the devices to the devices. Below, a control method of the system controller 30 will be described with reference to a control flowchart of FIG. 2.

First, the system controller 30 outputs the POST control signal to the SATA device 10 when powering on in operation S10.

Then, the system controller 30 detects the first recognition information from the SATA device 10 and the second recognition information 25 in operation S20.

The system controller 30 determines whether the first recognition information is received from the SATA device 10, and thus determines whether the SATA device 10 is mounted or not in operation S30.

If the first recognition information is received, the system controller 30 initializes the SATA device 10 and resumes the POST in operation S40. Because the SATA device 10 is connected to the computer system 100, there is the second recognition information 25 stored in the SATA controller 20. The system controller 30 determines that the SATA device 10 is mounted normally since it receives a normal signal from the SATA device 10 along with the second recognition information.

In the first embodiment, the computer system 100 includes a device controller having information about a physical or electrical connection of a device attached to the computer system 100. If the device controller for communication of the device does not contain the information about the physical connection of the device, i.e., if the device controller does not support the flag signal such as the second recognition information, it may be impossible to apply this embodiment. Thus, the computer system 100 includes a certain device controller, which has the connection information of the device to be controlled, among the device controllers. Such a device controller may include a USB controller, etc., as well as the foregoing SATA controller.

On the other hand, if the first recognition information is not received even though it is checked that the SATA device 10 is mounted on the basis of the second recognition information 25, the system controller 30 determines that the SATA device 20 is abnormally recognized, and performs a system reset in operation S50. While the system reset is performed, the SATA device 20 is also reset. As the SATA device 20 is reset and thus restored normally, the SATA device 20 can output first recognition information when receiving a new POST control signal.

In a conventional computer system, if the system controller does not receive any response to the POST control signal from the device, the bootstrap is not performed due to a system error. On the other hand, in this embodiment, the computer system 100 tries to boot up again since the system reset is performed on the basis of the second recognition information 25 stored in the SATA controller 20, and a reboot of the computer system 100 can be performed without a specific manipulation of a user since the device is reset. Accordingly, the computer system 100 automatically overcomes an error in a state that a user does not become aware of the error, so that the reliability of the computer system can be enhanced.

Figure 3:
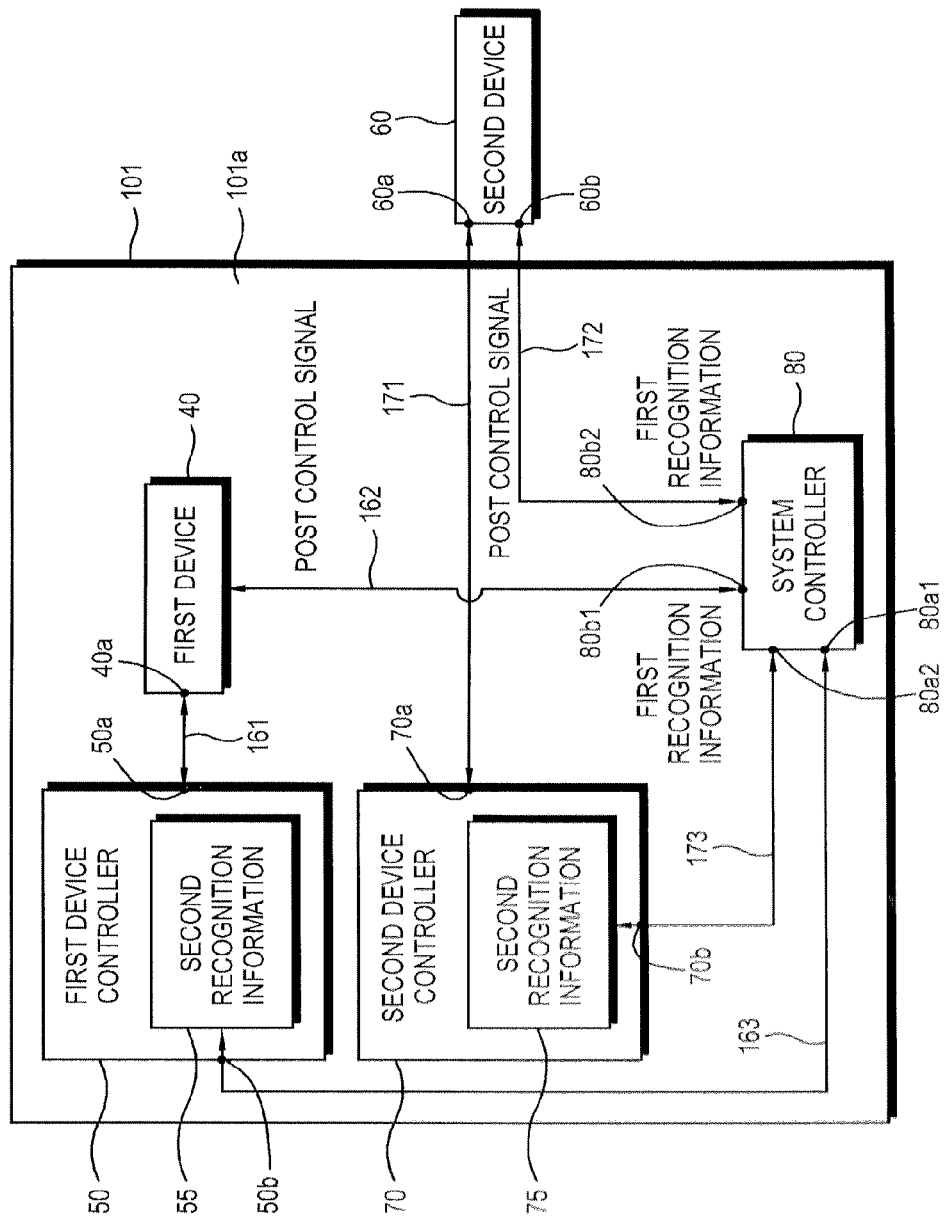
FIG. 3 is a control block diagram illustrating a computer system according to an embodiment of the present general inventive concept.
Figure 4:
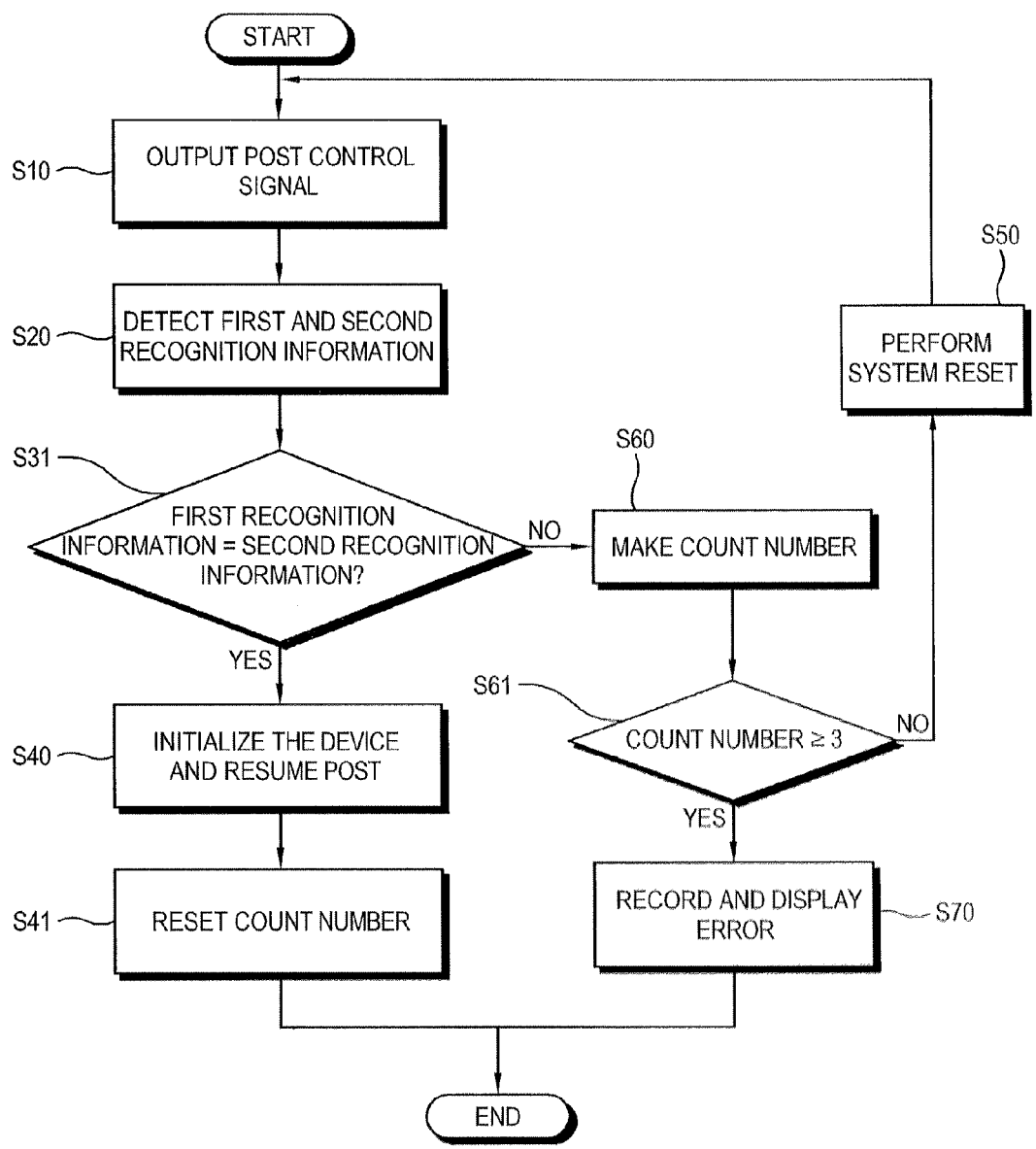
FIG. 4 is a control flowchart illustrating a control method of a computer system according to an embodiment of the present general inventive concept.

FIG. 3 is a control block diagram illustrating a computer system 101 according to an embodiment of the present general inventive concept, and FIG. 4 is a control flowchart illustrating a control method of a computer system according to an embodiment of the present general inventive concept.

As illustrated in FIGS. 3 and 4, the computer system 101 includes a plurality of devices 40 and 60, first and second device controllers 50 and 70 connected to the plurality of devices 40 and 60, respectively, and a system controller 80.

The first device 40 is connected to the first device controller 50 through an internal connector of the computer system 101. For example, the first device 40 may be a SATA hard disk drive (HDD), or the like. The second device 60 is connected to the second device controller 70 through an external connector from the outside of the computer system 101. For example, the second device 60 may be an external SATA HDD or a USB memory. If the second device 60 is the USB memory, the external connector supports a USB standard.

In a case that the first device 40 is mounted to the computer system 101, second recognition information 55 about a physical connection of the first device 40 is stored in the first device controller 50. Further, in a case that the second device 60 is mounted to the computer system 101, second recognition information 75 about a physical connection of the second device 60 is stored in the second device controller 70.

According to an embodiment of the present general inventive concept, the first device 40 includes terminals 40a and 40b to be connected to terminals 50a and 80b1 of the first device controller 50 and the system controller 80 through communication lines (internal connector) 161 and 162, respectively. The second device 60 includes terminals 60a and 60b to be connected to terminals 70a and 80b2 of the second device controller 50 and the system controller 80 through communication lines (external connector) 171 and 172, respectively. Terminals 80a1 and 80a2 of the system controller 80 may be connected to terminals 50a and 70b of the first and second device controller 50 and 70 through communication lines 163 and 173, respectively. When the first device 40 is mounted to the inside or outside of the housing 101a of the computer system 101, the terminals 40a and 40b can be connected to ends of the communication lines 161 and 162. In this case, the ends of the communication lines 161 and 162 may be formed with terminals or a shape of slots to receive the terminals 40a and 40b of the first device 40. When the second device 40 is mounted to the outside of the housing 101a of the computer system 101, the terminals 60a and 60b can be connected to ends of the communication lines 171 and 172 which can be extended to expose the outside of the housing 101a. In this case, the ends of the communication lines 171 and 172 may be formed with terminals or a shape of slots to receive the terminals 60a and 60b of the second device 60.

As described above, the first and second devices 40 and 60 may include a memory unit to store data, and a control unit to communicate with the first and second device controllers 50 and 70, respectively, and the system controller 30 to receive data to be stored in the memory unit and to transmit data read from the memory unit to at least one of the first and second controllers 50 and 70 and the system controller 30. Also the control unit of the first and second devices 40 and 60 can generate a first signal representing first recognition information and a second signal representing second recognition information.

The first recognition information is generated when the device 40 or 60 is mounted to the housing 100a of the computer system 100, or when the device 40 or 60 is supplied with a first electrical power through the system controller 80 or a power source. The second recognition information is generated when the computer system 100 is booted or turned on or when the device 40 or 60 is supplied with a second electrical power after the first electrical power is disconnected. However, the present general inventive concept is not limited thereto. The first recognition information and the second recognition information can be sequentially generate according to a method of generating the first and second recognition information which will be described hereinafter The system controller 80 first outputs a POST control signal to the first and second devices 40 and 60 as shown in FIG. 3 when powering on in operation S10, and detects the first recognition information 55 from the devices 40 and 60 and the second recognition information 55, 75 from the device controllers 50 and 70 in operation S20.

Then, the system controller 80 determines whether the first recognition information and the second recognition information 55, 75 are matched with each other in operation S31.

In result, if the respective ones of the first recognition information do not match the corresponding ones of the second recognition information 55 and 75 respectively, the system controller 80 makes a count number of errors in recognizing the device in operation S60. When the respective ones of the first recognition information do not match the corresponding ones of the second recognition information 55 and 75 respectively, information about the device stored in the system controller 80, i.e., a BIOS, may be different from the first recognition information, or there may be no first recognition information to be matched with the second recognition information since the first recognition information is not received.

Then, the system controller 80 determines whether the count number is equal to or more than a preset value, e.g., 3, in operation S61. If the count number is less than 3, the system controller 80 determines that the device is abnormally recognized, and performs a system reset in operation S50.

On the other hand, if the count number is equal to or more than 3, the system controller 80 determines that there arises a serious problem in initializing the device 40, 60 and booting up the computer system 101. The system controller 80 records and displays device errors to thereby show a user the device errors in operation S70. That the count number is more than a predetermined value corresponds to that the system controller 80 cannot successively recognize the devices even though it successively performs the system reset. In this case, the system controller 80 does not perform the system reset any more because the error of the device 40, 60 is not overcome even though the device 40, 60 is reset. Here, a limited value of the count number may be variously set in consideration of a liking of a user, properties of the computer system 101, etc.

If the respective ones of the first recognition information are matched with the corresponding ones of the second recognition information 55 and 75 respectively, the system controller 80 initializes the device and resumes the POST. When the POST is finished, the bootstrap proceeds to load an operating system.

Then, the system controller 80 resets the count number made due to the errors after initializing the devices 40, 60 in operation S41. That is, the count number, which is increased according as the devices 40, 60 are not normally recognized, i.e., accumulated to 1 or 2 until the devices 40 and 60 are normally recognized, is reset into 0.

In the second embodiment, the system controller 80 sets up the limit value for resetting the computer system on the basis of the number of times for the system reset, and notifies a user to know that the error is not automatically overcome.

According to an embodiment of the present general inventive concept, an error signal is unconditionally output in response to a failure in recognizing a device, so that an error can be automatically overcome. To this end, the computer system 100, 101 includes the device controller 20, 50, 70 having information about the physical connections of the device 20, 40, 60, and the system controller 30, 80 resets the device that is physically connected but does not respond to the POST control signal, thereby overcoming the error. Thus, the system error is overcome and the reliability is enhanced.

As apparent from the above description, the present general inventive concept provides a computer system capable of correctly recognizing devices when booting up, and a control method thereof.

Also, the present general inventive concept provides a computer system capable of overcoming an error in recognizing devices, and a control method of the same.

Further, the present general inventive concept provides a computer system capable of counting errors in recognizing devices and selecting an error display or a system recovery, and a control method of the same.

Although a few exemplary embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A computer system comprising:
    at least one of devices which transmit data through a predetermined interface;
    a device controller which determines whether the at least one of the devices are physically mounted to the computer system; and
    a system controller which outputs a predetermined power on self test (POST) control signal to the physically mounted device among the at least one of the devices determined by the device controller when powering on, and recognizes the device if the device which receives the POST control signal outputs a predetermined response signal corresponding to the POST control signal, and performs a POST process, and when the device does not output the predetermined response signal corresponding to the POST control signal, the system controller determines that the device is not recognized and performs a system reset.

2. The computer system according to claim 1, wherein the device controller determines whether the device is physically mounted based on a flag signal generated when the device is mounted.

3. The computer system according to claim 1, wherein the interface supports a serial advanced technology attachment (SATA) standard.

4. The computer system according to claim 1, wherein the interface supports a universal serial bus (USB) standard.

5. The computer system according to claim 1, wherein the system controller makes a count number of an error in recognizing the device and records a device error if the count number exceeds a preset value, if the device controller determines that the device is physically mounted to the computer system and the device does not output the predetermined response signal corresponding to the POST control signal.

6. The computer system according to claim 5, wherein the system controller resets the count number when proceeding to initialize the device.

7. The computer system according to claim 1, wherein the system controller comprises a basic input/output system (BIOS).

8. A method of booting up a computer system that comprises at least one of devices to transmit data through a predetermined interface, the method comprising:
    determining whether the at least one of the devices are physically mounted to the computer system;
    outputting a predetermined power on self test (POST) control signal to the physically mounted device among the at least one of the devices, when powering on;
    detecting a predetermined response signal corresponding to the POST control signal from the device;
    recognizing the device and performing a POST process; and
    determining that the device is not recognized and performing a system reset, if the device does not output the predetermined response signal corresponding to the POST control signal.

9. The method according to claim 8, further comprising making a count number of an error in recognizing the device, and recording a device error if the counter number exceeds a preset value.

10. The method according to claim 9, further comprising resetting the count number when proceeding to initialize the device.

* * * * *